United States Patent [19]

Mahon et al.

[11] Patent Number: 5,610,817
[45] Date of Patent: Mar. 11, 1997

[54] PASSENGER RESTRAINT SYSTEM WITH AN ELECTRONIC CRASH SENSOR

[75] Inventors: Geoffrey L. Mahon, Ridgewood, N.J.; Ralph Hensler, New York, N.Y.

[73] Assignee: Breed Automotive Technology, Inc., Lakeland, Fla.

[21] Appl. No.: 14,617

[22] Filed: Feb. 8, 1993

[51] Int. Cl.$^6$ ................................................ B60R 21/32
[52] U.S. Cl. ............................ 364/424.056; 180/274; 250/735; 340/436
[58] Field of Search ................... 364/424.01, 424.05, 364/426.02, 431.01; 280/735, 728.05; 340/436, 429, 566, 665

[56] References Cited

U.S. PATENT DOCUMENTS

| | | | |
|---|---|---|---|
| 3,701,903 | 10/1972 | Merhar | 307/9.1 |
| 3,786,491 | 1/1974 | Carleton | 340/347 NT |
| 3,903,405 | 9/1975 | Gaskill, Jr. | 364/728.05 |
| 3,911,391 | 10/1975 | Held et al. | 340/52 |
| 4,329,549 | 5/1982 | Breed | 200/61.45 M |
| 4,638,179 | 1/1987 | Mattes et al. | 280/735 |
| 4,975,850 | 12/1990 | Diller | 280/735 |
| 4,985,835 | 1/1991 | Sterler et al. | 364/424.05 |
| 4,994,972 | 2/1991 | Diller | 364/424.05 |
| 5,021,678 | 6/1991 | Diller | 307/10.1 |
| 5,037,129 | 8/1991 | Fritz et al. | 280/734 |
| 5,038,134 | 8/1991 | Kondo et al. | 340/438 |
| 5,040,118 | 8/1991 | Diller | 364/424.05 |
| 5,065,322 | 11/1991 | Mazur et al. | 364/424.05 |
| 5,068,793 | 11/1991 | Codne et al. | 280/735 |
| 5,081,587 | 1/1992 | Okano | 364/424.05 |
| 5,083,276 | 1/1992 | Okano et al. | 364/424.05 |
| 5,164,901 | 11/1992 | Blackburn et al. | 364/424.05 |
| 5,189,311 | 2/1993 | Moriyama et al. | 307/10.1 |
| 5,208,484 | 5/1993 | Okano et al. | 307/10.1 |
| 5,261,694 | 11/1993 | White et al. | 280/735 |
| 5,285,187 | 2/1994 | Hirao et al. | 340/436 |
| 5,309,138 | 5/1994 | Tohbaru | 340/436 |
| 5,339,242 | 8/1994 | Reid et al. | 364/424.05 |

FOREIGN PATENT DOCUMENTS

| | | |
|---|---|---|
| 0440133A2 | 1/1991 | European Pat. Off. . |
| 1425981 | 4/1973 | United Kingdom . |
| PCT/GB88/ 00257 | 10/1988 | United Kingdom . |
| WO88/07461 | 3/1988 | WIPO . |

OTHER PUBLICATIONS

French Search Report and Annex No. FA 499316/FR 9401286 dated Sep. 1, 1995.
Examination Report Under Section 18(3) dated Nov. 10, 1995.

*Primary Examiner*—Kevin J. Teska
*Assistant Examiner*—Thai Phan
*Attorney, Agent, or Firm*—Kane, Dalsimer, Sullivan, Kurucz, Levy, Eisele and Richard, LLP

[57] ABSTRACT

An electronic accelerometer is used to generate an acceleration signal for a passenger restraint system in a motor vehicle. The electrical signal is processed by emulating an electromechanical sensor to detect crashes. The electrical signal may also be differentiated to obtain a jerk signal also used to detect abnormal accelerations.

7 Claims, 3 Drawing Sheets

PASSENGER RESTRAINT SYSTEM WITH AN ELECTRONIC CRASH SENSOR

BACKGROUND OF THE INVENTION

1. Field of Invention

This invention pertains to an electronic sensor used for triggering a passenger or occupant restraint system such as an airbag in a motor vehicle, and more particularly to a sensor which detects events requiring such restraint by using an electronic accelerometer.

2. Description of the Prior Art

In the following, the term passenger shall be used to refer to any occupant in a motor vehicle, including the driver. Breed Automotive Technologies, Inc. (BAT), the assignee of the present invention has been very successful in developing various crash sensors for motor vehicle passenger restraint systems. These sensors include ball-in-tube electromechanical sensors, such as the one illustrated in U.S. Pat. No. 4,329,549, which consists of an elongated tubular chamber holding a ball made of a ferromagnetic material. At one end of the chamber, the sensor is provided with a magnet for biasing the ball at a preselected force. At the other end, the chamber is provided with two electrical contacts. The sensor is mounted in the vehicle with the ball being positioned against the back of the chamber when no deceleration occurs by the biasing force of the magnet. The sensor is positioned in such a manner that when the vehicle experiences a deceleration in excess of the biasing force of the magnet, the ball moves through the tubular chamber until it hits the electrical contact blades. The ball is made of or coated with an electrically conductive material so that when it reaches the contacts, it establishes an electrical path therebetween. In other words, the ball and contacts cooperate to form an electrical switch which closes when the vehicle is involved in a serious crash. The movement of the ball is damped by the air in the tubular chamber. Mechanical sensors are also known wherein, as described in U.S. Pat. No. 4,573,706, gas damped balls are used to trigger igniter caps.

Motor vehicles are now provided or will be provided with various electronic devices including antilock braking systems, electronically adjusting suspension systems, passenger position indication systems and so on. All these systems provide information which may be useful for the operation of passenger restraint systems. However, this information cannot be easily integrated with systems using electromechanical sensors.

Crash sensors using electronic accelerometers such as piezo-resistive, piezo-capacitive, piezo-voltaic and piezo-electric devices and others have been suggested previously, however they have not provided satisfactory performance especially in crashes which involve a small portion of a vehicle's frontal cross section such as crashes into poles, trees, etc.

OBJECTIVES AND SUMMARY OF THE INVENTION

In view of the above-mentioned disadvantages of the prior art, it is an objective of the present invention to provide a crash sensor system with an electronic accelerometer which is accurate and reliable.

Yet another objective is to provide a system which has relatively few elements so that it can be assembled to form a small and inexpensive package.

A further objective is to provide a system which can be easily interfaced with other on-board vehicle electronic systems such as diagnostic systems, antiskid braking systems, seat position sensors, seat occupant position sensors, seat belt engagement detectors, child seat detectors, automated suspension systems and so on.

Other objectives and advantages of the invention shall become apparent from the following description.

A passenger restraint system constructed in accordance with this invention includes an electronic accelerometer mounted on a motor vehicle, signal processing means for processing the accelerometer output and passenger restraint means, such as airbags, or seatbelt tensioners triggered by the signal processing means when a serious crash is detected. The electronic accelerometer is a device which generates an electrical signal indicative or proportional to the acceleration (and deceleration) of the motor vehicle. The signal processing means uses this electrical signal to emulate the response of a ball-in-tube electromechanical sensor.

In an alternate embodiment, the signal processing means may also calculate the jerk within a motor vehicle and use it as an indicia for a serious crash.

DETAILED DESCRIPTION OF THE INVENTION

Figures 1, 2:
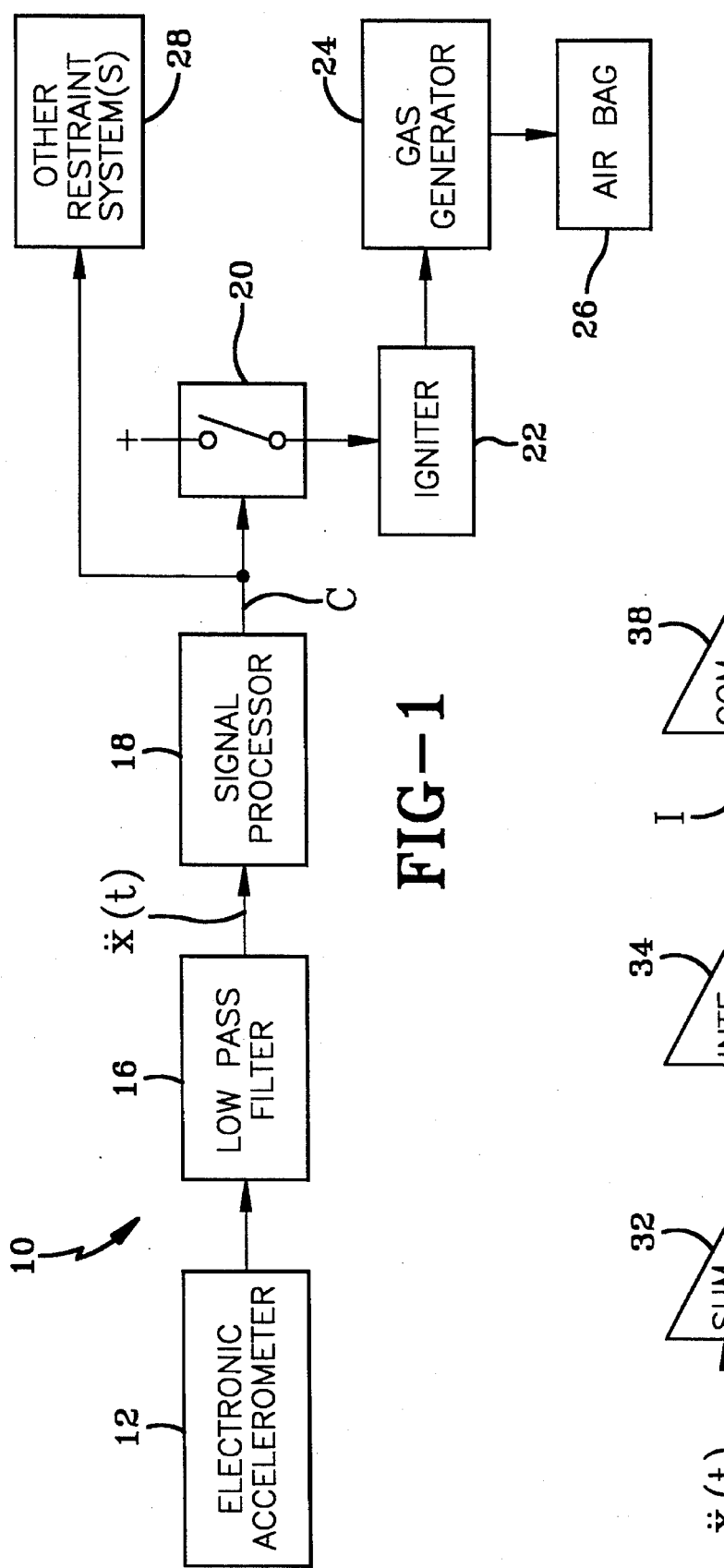
FIG. 1 shows a block diagram of a passenger restraint system constructed in accordance with this invention.
FIG. 2 shows details of the signal processing circuitry of the diagram of FIG. 1 for a first embodiment of the invention.

Referring now to FIG. 1, a restraint system 10 constructed in accordance with this invention consists of an electronic accelerometer 12 used to measure the acceleration and vibration within a motor vehicle. For this purpose, the accelerometer is mounted solidly on a motor vehicle member such as the center cowl, the A-pillar, the bulkhead and so on. This accelerometer may include a micromachined accelerometer (making use of piezo-resistive, capacitive, piezo-voltaic or piezo-electric phenomena) which is available from various vendors, including companies like Hitachi, IC Sensors, Nova Sensors, Analog Devices etc. Preferably, the accelerometer should have a dynamic sensitivity of at least 2 KHz (+/− 5% maximum signal change). The solid mounting of the accelerometer as described above insures that the accelerometer detects the shocks and vibrations produced during a collision. For example, the accelerometer may be incorporated in a diagnostic module used to monitor the status of the system.

The sensor within the accelerometer 12 generates a waveform which may need temperature compensation and filtering. Therefore, the accelerometer 12 includes signal conditioning circuitry which provides amplification, temperature compensation and other functions required to obtain an accurate output in a pre-selected range. Alternatively, external signal conditioning and filtering circuits may be provided in the system.

The present inventors have found that frequently motor vehicle bodies exhibit characteristic vibrations of up to 2 Khz during crashes which may be used as a signature for crash analysis. In order to sense acceleration signals in this range while eliminating noise, the accelerometer output may be filtered through a low pass filter 16. Preferably this filter has a very sharp cut-off selected within the range of 1–2 KHz, depending on the motor vehicle.

For certain car bodies it may be preferable to monitor acceleration at other frequency ranges which may be selected by using high, band-limiting filters, band-pass filters and so on for filter 16.

In any event after conditioning and optional filtering, a time varying signal is generated by the sensor indicative of the acceleration of the motor vehicle which is designated in FIG. 1 as $\ddot{x}(t)$. This signal is fed to a signal processing circuit 18. This circuit 18 monitors signal $\ddot{x}(t)$ on a continuous basis while the motor vehicle is operated. If circuit 18 determines that a serious crash has occurred, it generates a signal C. This signal is used to selectively close a switch 20. Switch 20 provides electrical current to an igniter 22. When switch 20 is closed the igniter 22 sets off a gas generator 24 which in response generates a large amount of inflator gas used to inflate an airbag 26. Alternatively, switch 20 may be used to activate another passenger restraint system such as a seat belt.

It should be understood that in FIG. 1 a single switch 20, igniter 22, gas generator 24 and airbag 26 are shown for the sake of clarity. However, the signal C may be used to trigger two or more airbags 26, each having its own gas generator 24, igniter 22 and optionally, its own switch 20 for the sake of redundancy. For example, one airbag may be provided for the driver, and other bags may be provided for the front and/or the back seat passengers. In addition, or alternatively, signal C may be used to trigger other passenger restraint systems 28, such as a seat belt tension.

In FIG. 2, a first embodiment is shown for the signal processing circuit 18. In this embodiment, the signal $\ddot{x}(t)$ is fed to a first input of a summing amplifier 32. The second input of amplifier 32 receives a biasing coefficient in the form of a reference voltage VREF1. Amplifier 32 generates a signal which corresponds the difference between $\ddot{x}(t)$ and VREF1. This difference signal is first fed to an integrator 34. As described below, the integrator 34 is constructed so that its output is never negative. The output I of the integrator 34 is fed to a comparator 38 where this output is compared to a threshold coefficient VREF2. If the integrator output I is greater, the comparator output C is positive indicating that a serious crash has occurred requiring the airbag deployment.

The signal processing circuit 18 emulates a ball-in-tube electromechanical sensor described above and therefore the threshold or tolerance coefficients VREF1, VREF2 are set in a manner similar to the parameters selected for the ball-in-tube electromechanical sensor. VREF1 corresponds to the biasing G-force on the sensor mass. It has typically a value in the range corresponding to 3–10 G's depending on the particular vehicle, its characteristics and customer requirements. VREF2 is the threshold of the sensor and is typically set in the range corresponding to 1–4 MPH.

It has been found that in many motor vehicles an electromechanical sensor as emulated in FIG. 2 is sufficient to trigger the airbag system, and for such applications the embodiment of FIG. 2 can be readily substituted. However, for other vehicles the arrangement of FIG. 3 was found to be more advantageous.

Figure 3:
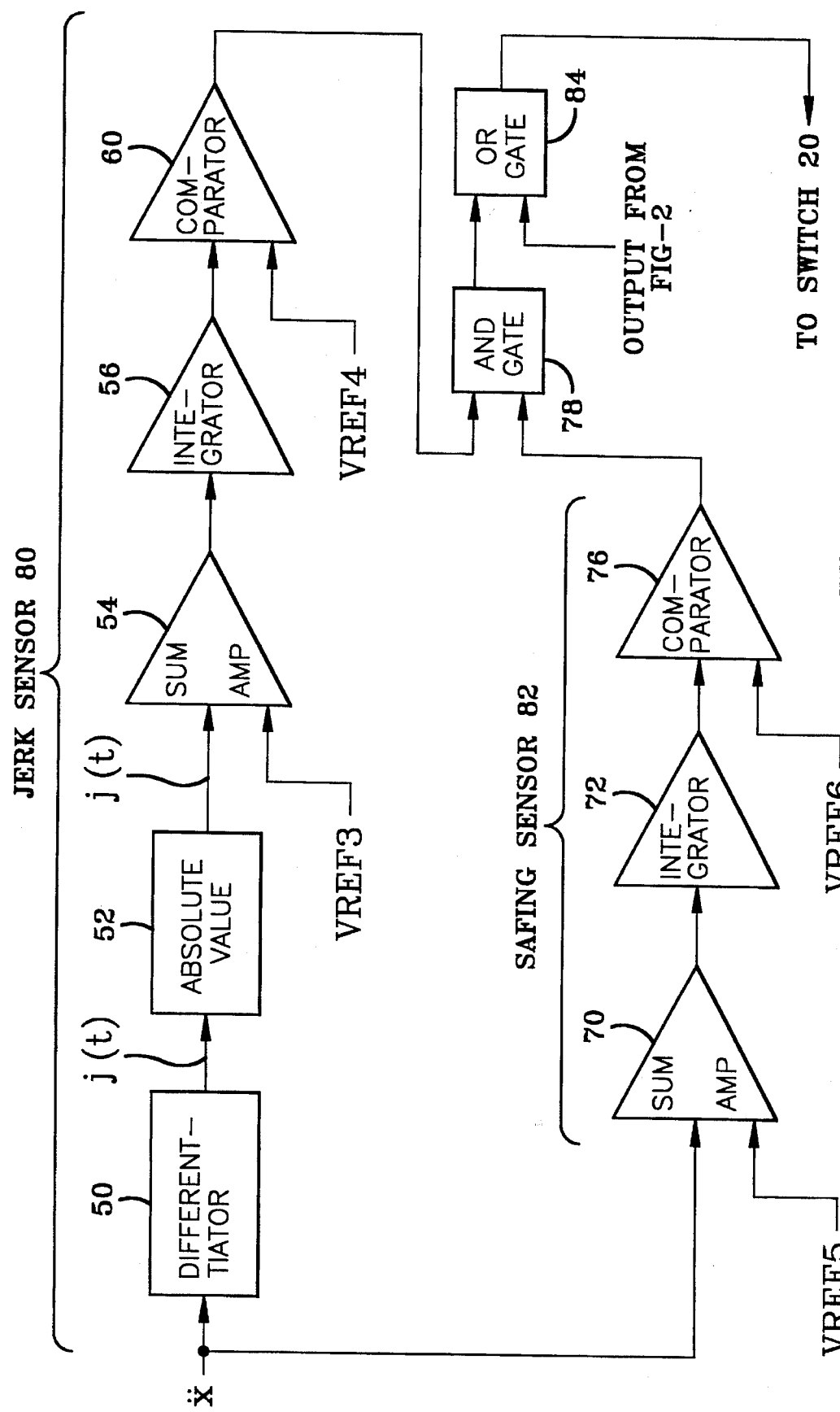
FIG. 3 shows details of the signal processing circuitry of the diagram of FIG. 1 for a second embodiment of the invention.

In FIG. 3, the signal $\ddot{x}(t)$ is first fed to a differentiator 50 which in response generates a signal j(t) which is indicative of the jerk of the motor vehicle member on which the accelerometer has been mounted. Since only the magnitude of the jerk is of any interest, this signal is fed to an absolute value converter 52 for generating a signal |j(t)|. Alternatively, the magnitude of j(t) may be obtained in converter 52 by other means such as by squaring j(t). The output of converter 52 is next fed to a summing amplifier 54 which also receives a reference coefficient VREF3. The amplifier 54 generates a signal corresponding to the difference between its inputs, which is fed to an integrator 56.

The integrated output (which is limited to non-negative values as discussed below) from integrator 56 is fed to a comparator 60 for comparing it to a coefficient VREF4. The output of comparator 60 is positive if the integrator output exceeds VREF4. The elements described so far define a jerk sensor 80.

As shown in FIG. 3, the signal $\ddot{x}(t)$ is also fed to a separate circuit consisting of a summing amplifier 70, integrator 72, and another comparator 76. This separate circuit is identical to the circuit of FIG. 2 except that it is using different coefficients VREF5, VREF6, set for emulating a safing sensor 82 as discussed more fully below.

The outputs of comparators 60 and 76 are fed to an AND gate 78 which generates an output only if it senses an output from both comparators. That is, gate 78 generates an output only if both the jerk sensor 80 and the safing sensor 82 generate a high output. The output of gate 78 can be used directly to close switch 20 on FIG. 1 and/or other means for triggering a passenger restraint device as discussed above. Alternatively, a three sensor arrangement may be used: a first sensor as shown in FIG. 2, a jerk sensor 80 and a safing sensor 82 shown in FIG. 3. In this latter configuration, the output of the first sensor can be fed to an OR gate 84 which also receives the input from gate 78. Gate 84 then generates a signal for closing switch 20 either when both sensors 80, 82 generate high outputs or when the sensor of FIG. 2 generates a high output.

Like the coefficients VREF1, VREF2 of FIG. 2, coefficients VREF5 and VREF6 are selected based on the particular construction of the motor vehicle and the specifications set by the motor vehicle manufacturer and or governmental agencies. Typical acceptable ranges for VREF5 is 1–2.5 G and for VREF6 0.5–3 MPH. These ranges coincide with typical coefficients used for existing safing sensors.

Coefficients for VREF3 and VREF4 are obtained from the data obtained during crash tests (actual or simulated) for a particular vehicle. The jerk of the mounting member during various crashes is measured and the coefficient VREF3 is set to correspond to the lowest jerk of jerk obtained for a serious crash, i.e. the jerk below which the restraint system is not to be triggered. VREF3 is generally in the range of 3,000–10,000 G/sec. VREF4 is a threshold level above VREF3 selected to insure that the sensor responds fast enough for the trigger of the restraint system. VREF4 may be in the range of 25–200 G's.

The arrangement shown in the Figures is advantageous in that it can run continuously in real time without any need for resetting its various operational parameters or for setting various sampling windows required by prior art electronic sensors.

Mathematically the three sensors perform a special summation as follows:

Sensor of FIG. 2:

$$\sum_{t=0}^{t} (\ddot{x}(t) - VREF1) \Delta t > VREF2 \quad (1)$$

The jerk sensor 80:

$$\sum_{t=0}^{t} (|j(t)| - VREF3) \Delta t > VREF4 \quad (2)$$

The safing sensor 82:

$$\sum_{t=0}^{t} (\ddot{x}(t) - VREF5) \Delta t > VREF6 \quad (3)$$

These summations are performed such that their respective results are always non-negative. That is, for each of the formulas, after each time period Δ t, the difference defined between the respective parameters is repetitively calculated and added to the previous difference. If the result is non-negative, it is compared with the respective reference value VREF and also used for the next summation. If the result is negative, it is set to zero.

Figure 4:
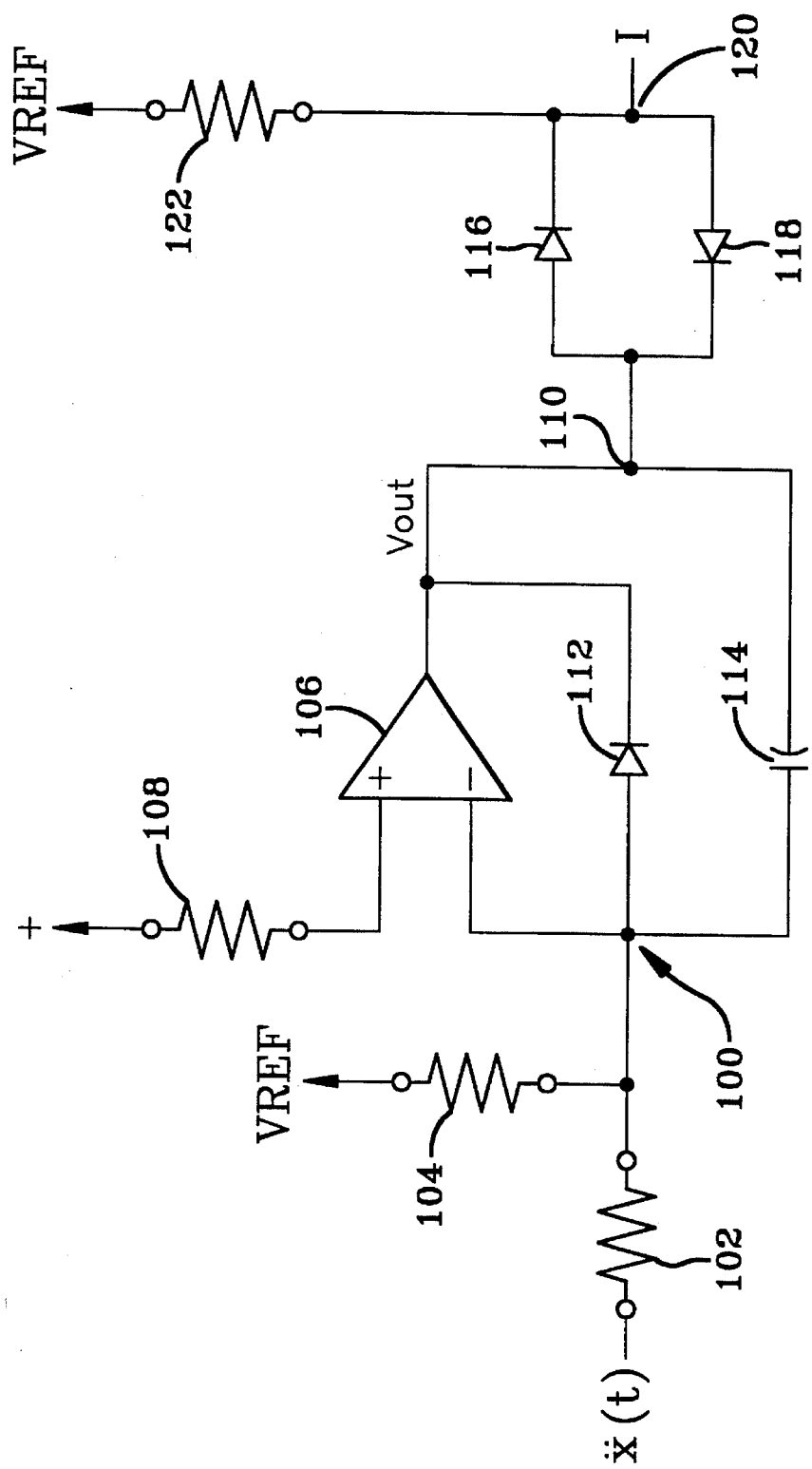
FIG. 4 shows an integrator circuit for FIGS. 2 and 3.

In FIG. 4 a typical circuit is shown which may be used to show summing amplifiers (32, 54, 70) and the integrator (34, 56, 72) in FIGS. 2 and 3. In this Figure, the output of accelerometer 12 has been inverted by filtering circuits (not shown) to appear as –ẍ(t). This signal is fed to a summing node 100 through a resistor 102. Node 100 is also connected to one of the voltage references level (here generically identified as VREF) through a resistor 104. Node 100 provides the input to the inverting input gate of an amplifier 106. The non-inverting gate is connected to a power supply through a resistor 108. Thus the inverting input gate thus receives a signal indicative of the difference VREF–ẍ(t) which is inverted by the amplifier 106. The node 100 is also connected to an output node 110 through a diode 112 and a capacitor 114. Capacitor 114 cooperates with amplifier 106 to form a standard integrator. Node 110 is connected to the output of amplifier 106 and to two diodes 116, 118 to a further node which generates the integrated output signal I. As shown in FIG. 4, node 120 is also connected to the reference VREF through a resistor 122. Importantly resistors 104, 122 have matching resistances.

This circuit operates as follows. If the input to the inverting gate of amplifier 106 is negative, diodes 112 and 118 are backbiased and output I tracks the difference ẍ(t) –VREF. If the integrator output goes below a preset value, diodes 112 and 118 are forward biased from the equal currents flowing from VREF. As a result, capacitor 114 is discharged and the integrating voltage across the capacitor and the integrated output to nearly zero. Thus the signal I represents the non-negative summation over time as described above. Of course for the jerk sensor the input to node 100 is j(t) not ẍ(t).

Thus, a passenger restraint system is described wherein electromechanical sensors are replaced by an electronic sensor. In this system, information from other on-board equipment such as anti-lock braking systems, seat sensors and so on can be readily integrated into the decision making process for triggering an airbag or other restraint device as required.

In the above embodiments, analog voltage signal processing circuitry was described. Of course, analog current signal circuitry may be used just as well. Alternatively, the signal processing circuitry may also be implemented using digital signal processing techniques.

Numerous modifications may be made to the present invention without departing from its scope as defined in the appended claims.

We claim:

1. A collision detecting system comprising:
   a. electronic sensor means mounted on a motor vehicle member for generating an electrical input signal substantially to the acceleration of said vehicle member;
   b. first signal processing means for receiving the electrical input signal from said electronic sensor and generating a jerk signal indicative of the jerk of said member, said first signal processing means generating a first trigger signal responsive to a jerk signal of a preselected value, said first signal processing means including:
      (i) differentiating means for differentiating said electrical input signal to generate said jerk signal,
      (ii) means for generating the magnitude of said jerk signal,
      (iii) first summing means for generating a first difference signal dependent on the difference between the magnitude of said jerk signal and a first reference selected independently from said electrical input signal,
      (iv) first integrating means for integrating said first difference signal to generate a first integrated signal, said integrating means being constructed such that said first integrated signal never has a negative value, and
      (v) first comparator means for comparing said first integrated signal to a second reference selected independently from said electrical input signal;
   c. second signal processing means for receiving the electrical input signal from said electronic sensor and generating a signal indicative of a change in acceleration of said member, said second signal processing means generating a second trigger signal responsive to a change in acceleration of said member of a preselected value, said second signal processing means including:
      (i) summing means for obtaining a second difference signal between said electrical input signal a third reference signal selected independently from said electrical input signal,
      (ii) integrating means for integrating said second difference signal over time to generate a second integrated signal, said integrating means being constructed such that said second integrated signal never has a negative value, and
      (iii) comparator means for comparing the second integrated signal with a fourth reference signal selected independently from said electrical input signal: and
   d. triggering means for triggering a passenger protection means in response to either said first trigger signal or said second trigger signal.

2. The collision detecting system of claim 1 wherein said summing means and said means comprise analog circuits.

3. The collision detecting system of claim 1 wherein said summing means includes a first node and first resistor connected thereto for receiving said electrical input signal, said first node being connected to a reference through a second resistor.

4. The collision detecting system of claim 3 wherein said integrating means includes an amplifier and a capacitor having ends connected to said first node and said output of said amplifier respectively, said first node being connected to said inverting input gate of said amplifier.

5. The collision detecting system of claim 1 further comprising third signal processing means for receiving the electrical input signal from said electronic sensor generating a second signal indicative of a change in acceleration of said member, said third signal processing means generating a third trigger signal responsive to a change in acceleration of said member of a second preselected value, said third signal processing means including:

(i) summing means for obtaining a third difference signal between said electrical input signal and a fifth reference signal selected independently from said electrical input signal, (ii) integrating means for integrating said third difference signal over time to generate a third integrated signal, said integrating means being constructed such that said third integrated signal never has a negative value, and (iii) comparator means for comparing the third integrated signal with a sixth reference signal selected independently from said electrical input signal; and wherein the triggering means for triggering a passenger protection means triggers said passenger protection means in response to either said first trigger signal or the sum of said second trigger signal and said third trigger signal.

6. The collision detecting system of claim 5 wherein said summing means includes a first node and first resistor connected thereto for receiving said electrical input signal, said first node being connected to a reference through a second resistor.

7. The collision detecting system of claim 6 wherein said integrating means includes an amplifier and a capacitor having ends connected to said first node and said output of said amplifier respectively, said first node being connected to said inverting input gate of said amplifier.

\* \* \* \* \*